Feb. 27, 1968          F. G. LOGAN          3,370,350

METHOD OF FASTENING CORES OF ELECTROMAGNETIC DEVICES

Filed March 24, 1965

INVENTOR.
FRANK G. LOGAN
BY
ATTYS.

United States Patent Office 3,370,350
Patented Feb. 27, 1968

3,370,350
METHOD OF FASTENING CORES OF ELECTROMAGNETIC DEVICES
Frank G. Logan, Annapolis, Md., assignor to the United States of America as represented by the Secretary of the Navy
Filed Mar. 24, 1965, Ser. No. 442,556
4 Claims. (Cl. 29—606)

ABSTRACT OF THE DISCLOSURE

An electromagnetic apparatus having a coil of electrical windings and a laminated core. The laminated core comprises a plurality of C-shaped core members which are secured together by epoxy resin, to form a composite O-shaped core.

---

The invention described herein may be manufactured and used by or for the Government of the United States of America for governmental purposes without the payment of any royalties thereon or therefor.

This invention relates to improvements in the fabrication of cores for electromagnetic devices, and more particularly to the fastening together of several core parts or members by means of a settable adhesive bonding agent such as epoxy resin to form a unitary core structure.

It has been known heretofore in the assembly of cores for transformers or the like to form butt joints wherein the mated end faces of the core members are bonded by an adhesive agent. The adhesively bonded butt joints have the advantages of protecting the end surfaces from corrosion, maintaining minimum or accurately spaced air gaps, and substantially reducing the operating noise level of transformers or the like embodying such bonded butt joints.

A principal object of this invention is the provision of a novel and improved method of forming bonded butt joints of the foregoing character and which method assures that the bonding medium fills all voids and interstices so as to insure the best coaction thereof with the core member faces, and further assures that all excess bonding agent is expressed from the gap to establish a minimum or accurately spaced air gap as desired prior to setting of the bonding agent.

As another object this invention aims to provide a method of manufacturing cores and improved cores manufactured thereby, which method eliminates the need of special mechanical bindings, clamps, or straps in the production of cores, whereby the method represents a particular advantage to small shops or shops making short run or limited quantity productions of cores.

Yet another object of this invention is to accomplish the foregoing objects through the provision of an improved method of fabricating cores for electromagnetic devices comprising the steps of providing core portions having opposed faces to be bonded, providing a plastic or flowable bonding agent between the opposed faces, subjecting the core members to an alternating magnetic field or flux so as to vibrate the core members and cause the bonding agent to fill all voids and interstices between the core member faces and so as to magnetically draw the core members together to express bonding agent from between the faces, terminating the alternating magnetic field or flux, and subjecting the core members to a relatively constant magnetic flux so as to magnetically hold the core members until the bonding agent sets.

Still another object of the invention is the provision of improved cores fabricated by the foregoing method, the cores being characterized by more complete bonding of the butt joints by virtue of agitation of the bonding agent during vibration of the core members while subjected to the alternating magnetic flux.

Other objects and advantages of the method and product of this invention will become apparent from the following detailed description of prefered modes of practice and illustrative embodiments, when read in conjunction with the accompanying sheet of drawings forming a part of this application, and in which.

Figure 1:
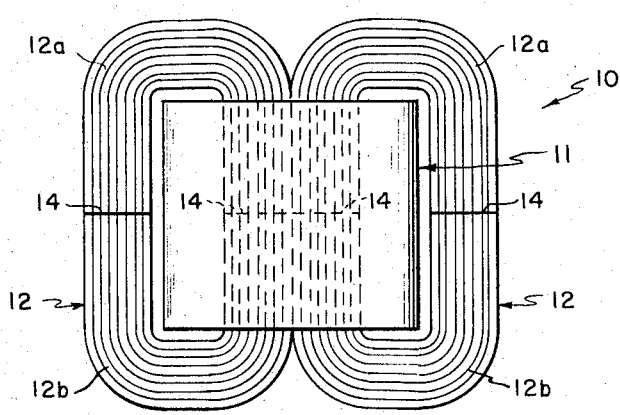
FIG. 1 is an elevational view of a transformer having core means embodying the present invention.

The invention will be described hereinafter with reference to the fabrication of the core means of a transformer 10, although it will be understood that the invention may be practiced in the fabrication of pole or core means of other magnetic devices. The transformer 10 comprises electrical windings, generally indicated as coil 11, mounted on adjacent legs of two rectangular cores 12.

The cores 12 each comprise a pair of laminated C-shaped core members 12a, 12b of conventional materials and construction and having machined end faces 13 mated to form butt joints 14. The butt joints 14 include an adhesive bonding agent in the form of an epoxy resin cement 15 which is cured to a hard state and adhesively bonds the core members 12a, 12b into a single unitary structure, the process of bonding the joints being carried out in the manner described more fully hereinafter.

Figure 2:
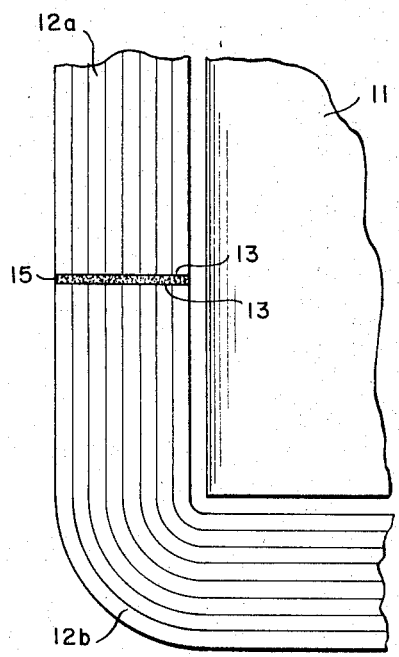
FIG. 2 is an enlarged fragmentary view of a portion of the transformer of FIG. 1.

It is to be noted at this point that the thickness of the epoxy cement 15 has been exaggerated in FIG. 2 for purposes of illustration and that the thickness of the cement may in practice be reduced to approach a zero air gap between the end faces 13.

Figure 3:
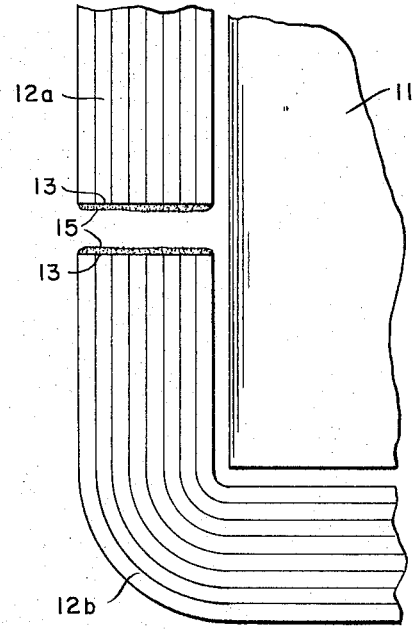
FIG. 3 is a view similar to FIG. 2 but showing the core members separated prior to forming a butt joint therebetween.

Referring to FIG. 3, a pair of core members 12a, 12b are shown with their end faces 13 in spaced relation prior to forming a butt joint 14. One or both of the faces 13 are coated with epoxy resin cement 15 which is of a type selected to exhibit good adhesion to the material of the core members when cured to a hard condition. In this regard many epoxy resin adhesives are known to those skilled in the art to which the invention pertains and need not be further described herein.

After the windings 11 are assembled on the core members, the epoxy coated faces 13 thereof are brought together with the epoxy resin cement therebetween. The core members are then subjected to an alternating magnetic field or flux such as may be conveniently produced by energization of the windings 11 from an alternating current source. According to the method of this invention the alternating field causes the core members to magnetically draw together expressing excess epoxy resin from between the faces 13. Moreover, the alternating field causes the core members 12a, 12b to vibrate somewhat as they are magnetically drawn together thereby agitating the epoxy resin and causing it to fill all voids and interstices.

The subjection of the core members 12a, 12b to an alternating field is then terminated and the core members are subjected to a relatively constant flux or field as by energizing the windings 11 with direct current. The application of the constant flux serves to magnetically clamp the core members together to maintain the desired relationship. The constant magnetic field or flux is maintained until the curing process of the epoxy resin is essentially complete and has brought it to its hardened state.

Thereafter, the direct current energization of the windings 11 (or other source of relatively constant magnetic flux) may be terminated and the hardened epoxy resin relied upon to adhesively bond the core members 12a, 12b into a unitary core structure.

In those instances where more than a nominally zero "air gap" is required, any suitable spacer means may be interposed between the core members 12a, 12b to limit the approach of the faces 13 and expression of the epoxy resin during the subjection of the core members to the alternating magnetic field. After curing of the resin while the core members are subjected to the constant or holding field, the cured resin will act as a permanent spacer while at the same time maintaining such an adhesive bond with the core members as to provide a unitary core structure with the desired air gap accurately established.

It will be understood that the term "air gap" is used to include a gap between the core faces 13 even though filled with an epoxy resin cement. Of course, an epoxy cement is used having magnetic properties which can be substantially equated to an actual air gap.

From the foregoing detailed description it will be appreciated that the novel and improved core bonding method of this invention fulfills the aforementioned objects and advantages as well as others apparent from the description. For example, the resulting cores have the additional advantages of eliminating the cost and weight of straps and bindings, and of providing a more compact and better appearing product.

Of course the invention may be utilized in the manufacture of other devices utilizing composite cores or members which may be subjected to successive alternating and constant magnetic fields during bonding. Accordingly, although the present invention has been described in considerable detail with reference to manufacture of a transformer core, it will be understood that the invention is not limited thereto, but rather the invention includes all those modifications, adaptations, substitutions and uses as are reasonably embraced by the scope of the claims hereof.

What is claimed is:

1. A method of fabricating an electromagnetic device comprising the steps of:
   providing a plurality of magnetic core members having opposed faces to be bonded together;
   assembling an electrical coil on at least one of said members;
   providing a settable bonding agent between said faces;
   butting said opposed faces of said core members to render at least one substantially magnetic path;
   activating the windings of said coil to subject said core members to an alternating magnetic field so as to vibrate said members and agitate said bonding agent while magnetically drawing said core members together to express excess bonding agent from between said faces;
   terminating said alternating magnetic field and activating said windings of said coil to subject said core members to a constant magnetic field so as to magnetically hold said core members together until said bonding agent sets.

2. A method of fabricating a core as defined in claim 1 and wherein said bonding agent comprises an epoxy resin.

3. A method of fabricating an electromagnetic device comprising the steps of:
   providing a plurality of magnetic laminated core members having opposed faces to be bonded together;
   assembling an electrical coil on at least one of said core members;
   providing a settable bonding agent between said faces;
   butting said opposed faces of said core members to render at least one substantially magnetic path;
   energizing said winding with alternating current so as to subject said core members to an alternating magnetic field effective to vibrate said members while magnetically drawing them together to express excess bonding agent from between said faces and bring said faces into predetermined close relation;
   terminating said energization of said winding with alternating current and establishing energization thereof with direct current, whereby said core members are magnetically held in said predetermined close relation until said bonding agent sets.

4. A method of fabricating a core as defined in claim 3 and wherein said bonding agent comprises an epoxy resin.

References Cited

UNITED STATES PATENTS

| | | | |
|---|---|---|---|
| 1,807,176 | 5/1931 | Schmidt | 29—155.61 |
| 2,315,654 | 4/1943 | Putman | 29—155.58 |
| 2,318,095 | 5/1943 | Putman | 29—155.61 X |
| 2,346,555 | 4/1944 | Cobb | 29—155.5 |
| 3,002,272 | 10/1961 | Hodges | 29—491 |
| 3,255,512 | 6/1966 | Lochner et al. | 29—155.56 |
| 3,289,279 | 12/1966 | Camp | 29—155.57 |
| 3,215,966 | 11/1966 | Lord, Jr, et al. | 29—155.61 X |
| 3,145,452 | 8/1964 | Camaras | 29—155.5 |

FOREIGN PATENTS 1,018,139  10/1957  Germany.

JOHN F. CAMPBELL, *Primary Examiner.*

R. W. CHURCH, *Assistant Examiner.*